United States Patent Office 3,282,930
Patented Nov. 1, 1966

3,282,930
HYDROXYALKYLENEPIPERAZINE DERIVATIVES AND ANALOGS THEREOF
Paul N. Craig, Roslyn, and Charles L. Zirkle, Berwyn, Pa., assignors to Smith Kline & French Laboratories, Philadelphia, Pa., a corporation of Pennsylvania
No Drawing. Filed Aug. 17, 1962, Ser. No. 217,535
10 Claims. (Cl. 260—240)

This application is a continuation-in-part of Serial No. 12,966, filed March 7, 1960, now U.S. Patent 3,192,204, and Serial No. 26,939, filed May 5, 1960, now abandoned.

This invention relates to new hydroxyalkylenepiperazine derivatives having useful pharmacodynamic activity.

More specifically the compounds of this invention have utility as tranquilizers, ataractics, antiemetics, antihistaminics, antispasmodics and general central nervous system depressants. In addition certain compounds of this invention have utility as intermediates for the preparation of other therapeutic compounds.

The novel compounds of this invention are represented by the following basic structural formula:

FORMULA I

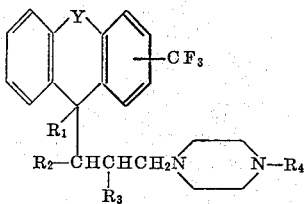

when:
Y represents sulfur or oxygen;
$R_1$ and $R_2$ represent hydrogen or, when taken together, a single bond;
$R_3$ represents hydrogen or methyl; and
$R_4$ represents hydroxyalkylene, lower alkanoyloxyalkylene, benzoyloxypropyl, carbamoyloxyethyl, dilower alkylcarbamoyloxyethyl, hydroxyethoxyethyl or hydroxyethoxyethoxyethyl.

The term "alkylene" where used herein denotes a divalent, branched or straight alkylene chain having 2 to 5 carbon atoms and separating the nitrogen and oxygen atoms to which it is attached by at least 2 carbon atoms. The term "lower alkanoyl" where used herein denotes a group having from 1 to 4, preferably 2, carbon atoms and "lower alkyl" denotes a group having 1 to 4, preferably 1 to 2, carbon atoms.

Advantageous compounds of this invention are represented by the following basic structural formula:

FORMULA II

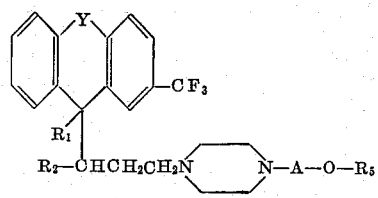

when:
Y represents sulfur or oxygen;
A represents a divalent branched or straight alkylene chain having 2 to 5 carbon atoms and separating the nitrogen and oxygen atoms to which it is attached by at least 2 carbon atoms;
$R_1$ and $R_2$ represent hydrogen or, when taken together, a single bond; and
$R_5$ represents hydrogen or acetyl.

Preferred compounds of this invention are those of Formula II in which $R_1$ and $R_2$ are hydrogen and A is ethylene.

This invention also includes pharmaceutically acceptable salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The hydroxyalkylenepiperazinylalkylidenetrifluoromethylthiaxanthenes and -xanthenes of this invention are prepared as shown in the following synthetic procedure:

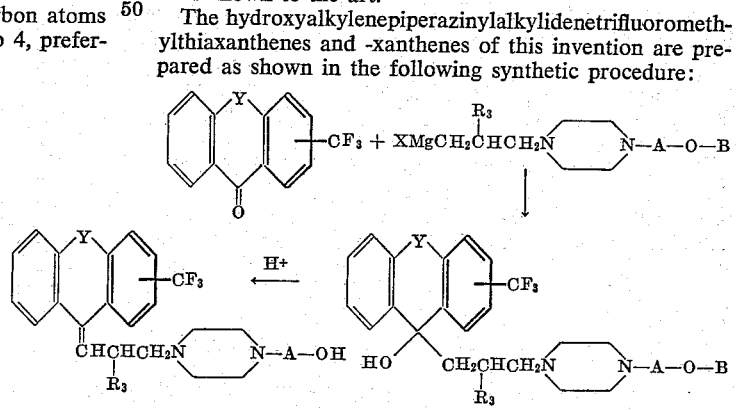

The terms Y, A and $R_3$ are as previously defined, X is halogen and B is benzyl or benzhydryl.

According to the above procedure, the trifluoromethylthiaxanthenone and trifluoromethylxanthenone starting material is reacted with a benzyl(or benxhydryl)oxyalkylenepiperazinylalkyl magnesium halide, preferably chloride or bromide, in an inert organic solvent such as an ether for example diethyl ether, dioxane or, preferably tetrahydrofuran. The reaction is carried out at a temperature of from about 30° to 100° C. for a reaction period of about 30 to 120 minutes. Removal of the solvent and treatment of the residue with water or with ammonium chloride solution separates the intermediate 10-benzyl(or benzhydryl)oxyalkylenepiperazinylalkyl - 10 - hydroxy-trifluoromethylthiaxanthene or the corresponding xanthene.

Dehydration and removal of the protective benzyl or benzhydryl group of the above prepared intermediate is accomplished by treatment with a mineral acid such as hydrochloric or sulfuric acid at about 60° to 100° C. for a period of about one to four hours. Removal of the excess acid gives the 10-hydroxyalkylenepiperazinylalkylidene-trifluoromethylthiaxanthenes or 9-hydroxyalkylenepiperazinylalkylidene-trifluoromethylxanthenes of this invention.

These alkylidene compounds, in addition to having utility as tranquilizers, ataractics, antiemetics, antihistamines, antispasmodics and general central nervous system depressants, are useful as intermediates in the preparation of hydroxyalkylenepiperazinylalkyl - trifluoromethylthiaxanthenes and the corresponding -xanthenes having the above described activity. The alkylidene compounds of this invention are reduced by hydrogenation in the presence of a hydrogenation catalyst, such as platinum oxide or palladium-on-charcoal to give the 10-hydroxyalkylenepiperazinylalkyl-trifluoromethylthiaxanthenes and 9-hydroxyalkylenepiperazinylalkyl - trifluoromethylxanthenes of this invention.

Alternatively the piperazinylalkyl derivatives of this invention may be prepared directly without going through the piperazinylalkylidene intermediate. The thiaxanthenones or xanthenones are reduced by catalytic hydrogenation or chemically, preferably with sodium and an alcohol such as for example, isobutyl or isoamyl alcohol, or a metal hydride such as lithium aluminum hydride. The resulting thiaxanthenes and xanthenes are alkylated with a reactive benzyl(or benzhydryl)oxyalkylenepiperazinylalkyl ester such as a halide, preferably chloride or bromide, or an arylsulfonate such as p-tosylate or phenylsulfonate in a suitable inert aromatic solvent such as benzene, xylene or toluene, in which at least one of the reactants is soluble. A suitable acid-binding agent may be included such as an alkali metal amide, preferably sodium potassium amide; an alkali metal hydride, for example potassium or sodium hydride; an alkali metal hydroxide, for example sodium or potassium hydroxide or an alkali metal aryl or alkyl compound, preferably phenyl sodium or butyl lithium. The prefered method of alkylation is to react the thiaxanthene or xanthene with a piperazinylalkyl chloride or bromide with a slight excess of sodium or potassium amide in refluxing benzene or toluene for from ½ to 24 hours, preferably 2 to 8 hours. The protective benzyl or benzhydryl group is removed by treating with a mineral acid such as hydrochloric or sulfuric acid at elevated temperature for example at about 60–100° C. for 1–2 hours.

To prepare further compounds of this invention the hydroxyalkylenepiperazinyl compounds prepared above are reacted with a lower alkanoyl halide, such as acetyl chloride, propionyl bromide or butyryl chloride, or a monocyclic aroyl halide such as benzoyl chloride in an inert organic solvent such as aromatic hydrocarbon for example benzene or xylene. The reacton is carried out at temperatures of about 25–100° C. for a reaction period of about 20 minutes to 15 hours. Concentration of the reaction mixture, neutralization of the residue with an alkali metal carbonate such as sodium or potassium carbonate, extraction with a water-immiscible solvent such as ether or benzene and evaporation of the extract gives the acyloxyalkylenepiperazinyl compounds of this invention. Similarly the di-lower alkylcarbamoyloxyethylpiperazines are prepared be reacting the hydroxyethyl compound with a di-lower alkylcarbamoyl halide.

The carbamoyloxyethylpiperazines of this invention are prepared by converting the corresponding hydroxyethyl compound to its phenylcarbonate salt and treating said salt with liquid ammonia in ether solution. The hydroxyethoxyethyl and hydroxyethoxyethoxyethylpiperazines are prepared by reacting the hydroxyethyl compounds with a chlorinating agent such as thionyl chloride and treating the resulting chloroethyl compound with ethylene glycol and β-hydroxyethyl ether respectively.

The trifluoromethylthiaxanthenone starting materials are prepared by condensing thiosalicylic acid with a 1-chloro-2-nitro-trifluoromethylbenzene to give o-(2-nitro-trifluoromethylphenylthio)benzoic acid; reducing the nitro group chemically, for example with stannous chloride and hydrochloric acid; removing the resulting amino group by diazotization and treatment with ethyl alcohol and cyclizing by refluxing the o-(trifluoromethylphenylthio) benzoic acid with a mineral acid such as sulfuric or polyphosphoric acid.

The trifluoromethylxanthenone starting materials are prepared from 2-chloro-trifluoromethylaniline by the following steps: (1) diazotizing the aniline and treating with potassium iodide to give chloro-iodotrifluoromethylbenzene, (2) replacement of the iodo atom by a carboxy group via the Grignard reaction, (3) condensation of the resulting 2-chloro-trifluoromethylbenzoic acid with phenol and (4) dehydration of the resulting 2-phenoxytrifluoromethylbenzoic acid to give the trifluoromethylxanthenone.

The alkylidene compounds of this invention may be present as cis or trans isomers as well as mixtures of these isomers. The isomers are separated by fractional crystallization of their acid addition salts from a suitable solvent or mixture of solvents such as, for example, acetone-ether or ethanol-ether. In addition, it will be readily apparent to one skilled in the art that certain compounds of this invention, notably those of Formula I in which $R_3$ is methyl, may be present as optical isomers. The connotation of the general formulas presented herein is to include all isomers, the separated d or l optical isomers as well as the dl mixture and the separated cis or trans isomers as well as the mixture of these isomers.

The following examples are not limiting but are illustrative of compounds of this invention and the procedures for their preparation and will serve to make fully apparent all of the compounds embraced by the general formulas given above.

*Example 1*

A solution of 115.5 g. of thiosalicylic acid in 3.2 l. of aqueous ethanol containing 62.0 g. of sodium hydroxide is treated with 168.8 g. of 1-chloro-2-nitro-4-trifluoromethylbenzene. Refluxing for 45 minutes, filtering, diluting the filtrate with water, acidifying with dilute hydrochloric acid and filtering the precipitate gives o-(2-nitro-4-trifluoromethylphenylthio)benzoic acid, M.P. 179–180° C.

A mixture of 230 g. of the above prepared nitro compound and a suspension of 1550 g. of stannous chloride dihydrate in 1700 ml. of glacial acetic acid and 70 ml. of water which has been treated with hydrogen chloride gas is warmed on a steam bath for three hours, then poured into 4 l. of water. The precipitate, o-(2-amino-4-trifluoromethylphenylthio)benzoic acid, is filtered off, washed with water and recrystallized from ether-petroleum ether.

The above prepared amino compound (158.4 g.) in 84 ml. of sulfuric acid and 1 liter of ethanol is cooled to −2 to 0° C. and treated with 42 g. of sodium nitrite in 75 ml. of water. The resulting mixture is stirred at 0° for 30 minutes. Ethanol (300 ml.) and 2 g. of copper-bronze powder are added. The mixture is stirred allowing the temperature to rise slowly to reflux temperature and maintained at this temperature for 1.5 hours. The mixture is filtered, concentrated, diluted with water and filtered to give o-(4-trifluoromethylphenylthio)benzoic acid, M.P. 153–154° C. Heating this compound (60.0 g.) for two hours on the steam bath with 200 ml. of concentrated sulfuric acid, cooling, pouring into water and collecting the precipitate, dissolving it in ether, agitating the ether solution with 10% sodium bicarbonate, filtering, washing with water, and evaporating the ether gives 2-trifluoromethyl-10-thiaxanthenone, M.P. 143–144.5° C. after recrystallization from petroleum ether.

A mixture of 200 g. of 3-benzyloxypropanol in 2 l. of pyridine at −5° C. is treated with 275 g. of p-toluenesulfonyl chloride and the resulting mixture is stirred at 0° C. for two hours. Water is added slowly at 0–5° C. Extracting with chloroform, washing the extract with dilute hydrochloric acid, water and potassium bicarbonate, and evaporating the solvent leaves 3-benzyloxypropyl p-toluenesulfonate.

A mixture of 186 g. of the above prepared p-toluenesulfonate, 106 g. of N-ethoxycarbonylpiperazine, 44 g. of potassium carbonate and 800 ml. of toluene is refluxed for 21 hours, then filtered and extracted with dilute hydrochloric acid. The extract is basified with sodium hydroxide and extracted into chloroform. Evaporation of the chloroform and distillation of the residue in vacuo gives 1-(3-benzyloxypropyl)-4-ethoxycarbonylpiperazine.

Hydrolysis and decarboxylation of this ester (188 g.) is accomplished by refluxing with 155 g. of potassium hydroxide, 155 ml. of water and 1550 ml. of ethanol for four days. Filtering, concentrating, adding water to the residue, acidifying with hydrochloric acid heating to 90° C., saturating with potassium carbonate, extracting into chloroform, evaporating and distilling the chloroform gives N-(3-benzyloxypropyl)-piperazine.

A mixture of 50 g. of the above prepared piperazine, 30.1 g. of sodium carbonate and 200 ml. of benzene is heated to reflux and treated with 39.5 g. of 3-bromopropanol over 1.5 hours. The resulting mixture is refluxed for two hours, then filtered, extracted with dilute hydrochloric acid, basified, extracted with benzene, and the extracts are concentrated and distilled to give 1-(3-benzyloxypropyl)-4-(3-hydroxypropyl)pipererazine. The free base is converted to the dihydrochloride salt by treatment of an alcoholic solution with ethereal hydrogen chloride to separate the salt.

Thionyl chloride (67 g.) is added over 15 minutes to a mixture of 39.5 g. of the above prepared dihydrochloride salt and 400 ml. of chloroform. Refluxing for four hours, cooling and filtering yields the dihydrochloride salt of 1-(3-benzyloxypropyl)-4-(3-chloropropyl)piperazine. The salt in aqueous solution is basified. Extraction with ether and evaporation of the solvent yields the free base.

Magnesium (1.3 g.) in 8 ml. of refluxing tetrahydrofuran is treated with 1 ml. of ethyl bromide. A solution of 22.7 g. of 1-(3-benzyloxypropyl)-4-(3-chloropropyl)-piperazine in 50 ml. of tetrahydrofuran is added slowly and the mixture is refluxed for one hour.

A solution of 14.0 g. of 2-trifluoromethyl-10-thiaxanthenone (prepared as above) in tetrahydrofuran is added over ½ hour and the refluxing is continued for two hours. Removing the solvent in vacuo, pouring the residue into ammonium chloride in cold water and filtering gives 10-{3-[4-(3-benzyloxypropyl)-1-piperazinyl]propyl}-10-hydroxy-2-trifluoromethylthiaxanthene.

Dehydration and debenzylation of the above prepared hydroxy compound by treating with concentrated hydrochloric acid at 90° C. for five hours gives a mixture of cis and trans isomers of 10-{3-[4-(3-hydroxypropyl)-1-piperazinyl]propylidene}-2-trifluoromethylthiaxanthene dihydrochloride. Separation of the isomers is accomplished by fractional crystallization from ethanol-ether.

The free bases are obtained by dissolving the cis, trans or mixture thereof of the dihydrochloride salts in aqueous ethanol, neutralizing with sodium carbonate and extracting with chloroform. The chloroform extracts are concentrated and distilled to give the 10-{3-[4-(3-hydroxypropyl)-1-piperazinyl]propylidene} - 2 - trifluoromethylthiaxanthene.

Hydrogenation of 2.0 g. of these propylidene compounds with 0.5 g. of palladium-on-charcoal in ethanol solution at atmospheric pressure for three hours gives, after filtering and concentrating, 10-{3-[4-(3-hydroxypropyl)-1-piperazinyl]propyl}-2 - trifluoromethylthiaxanthene.

*Example 2*

A mixture of 2.1 g. of a cis-trans mixture of 10-{3-[4-(3-hydroxypropyl) - 1 - piperazinyl]propylidene} - 2 - trifluoromethylthiaxanthene, made as in Example 1, and 15 ml. of benzene is treated with a solution of 1.0 g. of acetyl chloride in 15 ml. of benzene. Refluxing for 30 minutes, cooling and concentrating in vacuo gives, as the residue, a crude cis-trans mixture of 10-{3-[4-(3-acetoxypropyl)-1-piperazinyl]propylidene} - 2 - trifluoromethylthiaxanthene hydrochloride. Treating an alcoholic solution of these hydrochlorides with isopropanolic hydrogen chloride yields the dihydrochlorides which are separated by fractional crystallization from ethanol-ether.

The free bases are obtained by dissolving the salts in water, neutralizing with sodium carbonate, extracting with ether and concentrating the extracts.

Hydrogenation of the propylidene compounds in acetic acid solution with palladium-on-charcoal at 50 p.s.i. for two hours gives 10-{3-[4-(3-acetoxypropyl)-1-piperazinyl]propyl}-2-trifluoromethylthiaxanthene.

*Example 3*

A mixture of 2.0 g. of a cis-trans mixture of 10-{3-[4-(3-hydroxypropyl)-1-piperazinyl]propylidene} - 2 - trifluoromethylthiaxanthene, made as in Example 1, 1.5 g. of benzoyl chloride and 25 ml. of benzene is refluxed for 30 minutes. Cooling and concentrating in vacuo gives a cis-trans mixture of 10-{3-[4-(3-benzoyloxypropyl)-1-piperazinyl]propylidene} - 2 - trifluoromethylthiaxanthene hydrochloride. Treating this hydrochloride with isopropanolic hydrogen chloride and fractionally crystallizing the resulting dihydrochloride from ethanol-ether separates the cis and trans isomers.

The free bases are obtained by dissolving the salts in water, neutralizing with sodium carbonate, extracting with ether and evaporating the ether from the extracts.

A mixture of (cis-trans) 1.0 g. of 10-{3-[4-(3-benzoyloxypropyl)-1-piperazinyl]propylidene} - 2 - trifluorobethylthiaxanthene, 0.2 g. of palladium-on-charcoal and 25 ml. of ethanol is hydrogenated at 50 p.s.i. for two hours. Filtration and removal of the solvent in vacuo gives 10 - {3 - [4-(3-benzoyloxypropyl)-1-piperazinyl]propyl}-2-trifluoromethylthiaxanthene.

*Example 4*

2-chloro - 5 - trifluoromethylaniline (205.5 g.) in sulfuric acid solution (670 ml. of acid in 1330 ml. of water) is cooled to 0–5° C. and treated with 70 g. of sodium nitrate in 280 ml. of water. Potassium iodide (183 g.) in 275 ml. of water is added and the resulting mixture is allowed to stand for 16 hours, then heated at 50° C. for one hour. Extraction with ether, evaporation and distillation of the extracts gives 4-chloro-3-iodotrifluoromethylbenzene, B.P. 74–75° C. (5 mm.).

To magnesium turnings (14.5 g.) in 100 ml. of refluxing dry ether containing a few drops of ethylene bromide is added 176 g. of 4-chloro-3-iodotrifluoromethylbenzene in 900 ml. of anhydrous ether over 1.75 hours. The mixture is refluxed for two hours, then cooled to −20° C. and treated with dry ice. Hydrolyzing at 0° C. with cold dilute hydrochloric acid, extracting with ether, washing the extracts with 10% potassium carbonate, acidifying the aqueous layer with hydrochloric acid and filtering gives 2-chloro-5-trifluoromethylbenzoic acid.

A mixture of 105 g. of the above prepared benzoic acid, 56 g. of phenol, 69 g. of potassium carbonate, 5 g. of copper-bronze powder and 5 g. of cuprous iodide in 500 ml. of nitrobenzene is heated at 160–170° C. for five hours. The cooled mixture is treated with an additional 70 g. of potassium carbonate and steam distilled to remove the solvent. The aqueous solution is acidified with concentrated hydrochloric acid to give 2-phenoxy-5-trifluoromethylbenzoic acid which is recrystallized from carbon tetrachloride to give white crystals, M.P. 114–115.5° C.

A solution of 82 g. of 2-phenoxy-5-trifluoromethylbenzoic acid in 500 ml. of concentrated sulfuric acid is heated at 95° C. for two hours. The hot solution is poured into warm water. The white solid is collected and treated with 10% potassium carbonate, washed with water and recrystallized from benzene-petroleum ether to give white crystals (M.P. 119.5–120.5° C.) of 2-trifluoromethyl-9-xanthenone.

A solution of 13.2 g. of 2-trifluoromethyl-9-xanthenone in tetrahydrofuran is added over one hour to 16.7 g. of 3-[4-(3-benzloxypropyl-1 - piperazinyl]propylmagnesium chloride, prepared as in Example 1, in tetrahydrofuran while gently refluxing. Refluxing is continued for two hours. Concentrating, pouring the residue into ammonium chloride, ice and water, extracting with ether, evaporating the extracts and treating the residue with concentrated hydrochloric acid at 95° C. for one hour gives a mixture of cis and trans 9-{3-[4-(3-hydroxypropyl)-1-piperazinyl]propylidene} - 2 - trifluoromethylxanthene dihydrochloride. Fractional crystallization from ethanol-ether separates the isomers. The free bases are obtained by neutralizing an aqueous solution of the dihydrochloride, extracting into ether and evaporating the ether in vacuo.

Hydrogenation of the propylidene compound in acetic acid solution with palladium-on-charcoal at 50 p.s.i. for two hours gives 9-{3-[4-(3-hydroxypropyl)-1-piperazinyl]propyl}-2-trifluoromethylxanthene.

Example 5

A mixture of 1.5 g. of cis-trans 9-{3-[4-(3-hydroxypropyl) - 1 - piperazinyl]propyl}-2-trifluoromethylxanthene, made as in Example 4, and 0.8 g. of acetyl chloride is refluxed in 25 ml. of benzene for 20 minutes. Cooling and concentrating gives a cis-trans mixture of 9-{3-[4-(3-acetoxypropyl) - 1 - piperazinyl]propylidene}-2-trifluoromethylxanthene hydrochloride. Converting to the dihydrochloride and fractionally crystallizing from ethanol-ether separates the cis and trans dihydrochloride salts.

The free bases are obtained by neutralizing an aqueous solution of the salts with sodium carbonate, extracting with ether and evaporating the extracts.

Hydrogenation of the propylidene compound in ethanol solution with palladium-on-charcoal gives 9-{3-[4-(3-acetoxypropyl)-1-piperazinyl]propyl} - 2-trifluoromethylxanthene.

Treating a solution of the free base in ethyl acetate with excess maleic acid furnishes the dimaleate salt.

Example 6

A mixture of 14.0 g. of 3-trifluoromethyl-10-thiaxanthenone [prepared by reacting thiosalicylic acid with 1-chloro-2-nitro-5-trifluoromethylbenzene, reducing the resulting o-(2-nitro-5-trifluoromethylphenylthio)benzoic acid, deaminating by diazotizing the resulting o-(2-amino-5-trifluoromethylphenylthio)benzoic acid and treating with ethanol, and cyclizing by heating with concentrated sulfuric acid] and 16.7 g. of 3 - [4-(3-benzyloxypropyl)-1-piperazinyl]propylmagnesium chloride, prepared as in Example 1, in 200 ml. of tetrahydrofuran is refluxed for 90 minutes. Concentrating, pouring the residue into cold water and filtering yields 10-{3-[4-(3-benzyloxypropyl)-1-piperazinyl]propyl} - 10-hydroxy-3-trifluoromethylthiaxanthene.

Treatment of this hydroxy compound with 100 ml. of concentrated hydrochloric acid on a steam bath for three hours gives 10-{3-[4-(3-hydroxypropyl)-1-piperazinyl]propylidene}-3-trifluoromethylthiaxanthene dihydrochloride, cis-trans mixture. Fractional crystallization from acetone-ether separates the cis and trans isomers.

Hydrogenation of the free bases (obtained by neutralizing an aqueous solution of the hydrochloride, extracting with ether and evaporating the extracts) using a palladium-on-charcoal catalyst at atmospheric pressure for three hours gives 10-{3-[4-(3-hydroxypropyl)-1-piperazinyl]propyl}-3-trifluoromethylthiaxanthene.

An ethyl acetate solution of the free base is treated with two molar equivalents of citric acid to give upon concentration and cooling, the dicitrate salt.

Example 7

Seven grams of 4-trifluoromethyl-10-thiaxanthenone [prepared according to the procedure in Example 1 from thiosalicylic acid and 1-chloro-1-nitro-3-trifluoromethylbenzene which is made by fluorinating 2-chloro-3-nitrobenzoic acid with sulfur tetrafluoride, J. Am. Chem. Soc. 81:3165–6 (1959)] and 8.4 g. of 3-[4-(3-benzyloxypropyl) - 1 - piperazinyl]propylmagnesium chloride, prepared as in Example 1, in 100 ml. of tetrahydrofuran are refluxed for 90 minutes. Working up as in Example 6 gives 10 - {3 - [4-(3-benzyloxypropyl)-1-piperazinyl]propyl}-10-hydroxy-4-trifluoromethylthiaxanthene.

Dehydration of this hydroxy compound by heating with concentrated hydrochloric acid at 85–90° C. for three hours gives a mixture of cis and trans 10-{3-[4-(3-hydroxypropyl)-1-piperazinyl]propylidene}-4-trifluoromethylthiaxanthene dihydrochloride. The isomers are separated by fractional crystallization from ethanol-ether.

Hydrogenation of the free base (prepared by neutralizing an ethanol solution of the hydrochloride with sodium carbonate, extracting with ether and evaporating the extracts) in ethanol solution with a platinum oxide catalyst gives 10-{3-[4-(3-hydroxypropyl)-1-piperazinyl]propyl}-4-trifluoromethylthiaxanthene.

Treatment of an ethanol solution of the free base with excess ethereal hydrogen bromide gives the dihydrobromide salt.

Example 8

A mixture of 13.2 g. of 1-trifluoromethyl-9-xanthenone (prepared by the procedure of Example 4 from 2-chloro-6-trifluoromethylaniline) and 16.7 g. of 3-[4-(3-benzyloxypropyl) - 1 - piperazinyl]propylmagnesium chloride, prepared as in Example 1, in 200 ml. of tetrahydrofuran is refluxed for one hour. Removal of the solvent in vacuo, treatment of the residue with cold water and filtration gives 9-{3-[4-(3-benzyloxypropyl)-1-piperazinyl]propyl}-9-hydroxy-1-trifluoromethylxanthene. Dehydration by treatment with concentrated hydrochloric acid gives 9-{3-[4-(3-hydroxypropyl) _ 1-piperazinyl]propylidene}-1-trifluoromethylxanthene dihydrochloride which is fractionally crystallized from acetone-ether.

Neutralization of an aqueous solution of the dihydrochloride salt furnishes the free base which is hydrogenated using a palladium-on-charcoal catalyst to give 9-{3-[4-(3-hydroxypropyl) - 1-piperazinyl]propyl}-1-trifluoromethylxanthene.

Example 9

A mixture of 14.0 g. of 2-trifluoromethyl-10-thiaxanthenone (prepared as in Example 1) and 18.1 g. of 3-[4-(4-benzyloxybutyl) - 1-piperazinyl]-2-methylpropylmagnesium chloride (prepared as in Example 1 by reacting 4-benzyloxybutanol with p-toluenesulfonyl chloride, condensing the resulting sulfonate with N-ethoxycarbonylpiperazine, hydrolyzing and decarboxylating to give N-(4-benzyloxybutyl)piperazine, condensing with 3-bromo-2-methylpropanol, treating with thionyl chloride and reacting the resulting 1-(4-benzyloxybutyl)-4-(3-chloro-2-methylpropyl)piperazine with magnesium in tetrahydrofuran solution) is heated at reflux in tetrahydrofuran for two hours. Working up as in Example 8 gives 10-{3-[4-(4-benzyloxybutyl) - 1-piperazinyl]-2-methylpropyl}-10-hydroxy-2-trifluoromethylthiaxanthene.

Heating the above prepared hydroxy compound with 100 ml. of concentrated hydrochloric acid at 90° C. for three hours, concentrating and triturating the residue with ether gives 10-{3-[4-(4-hydroxybutyl)-1-piperazinyl]-2-methylpropylidene} - 2-trifluoromethylthiaxanthene dihydrochloride (a mixture of cis and trans forms). Separation of the isomers is accomplished by fractional crystallization from ethanol-ether.

The free bases obtained by neutralization of an aqueous solution of the salts are hydrogenated using a palladium-on-charcoal catalyst to give 10-{3-[4-(4-hydroxybutyl)-1-piperazinyl]-2-methylpropyl} - 2 - trifluoromethylthiaxanthene.

Example 10

A mixture of 17.4 g. of 3-[4-(3-benzyloxy-2-methylpropyl) - 1 - piperazinyl]propylmagnesium chloride, prepared as in Example 1 from 3-benzyloxy-2-methylpropanol, and 14.0 g. of 2-trifluoromethylthiaxanthenone, prepared as in Example 1, is refluxed in tetrahydrofuran for two hours. Concentrating, adding cold water, filtering and heating the resulting hydroxy compound with concentrated hydrochloric acid at 90–95° C. for four hours yields a mixture of cis and trans 10-{3-[4-(3-hydroxy-2-methylpropyl)-1 - piperazinyl]propylidene} - 2-trifluoromethylthiaxanthene dihydrochloride. Fractional crystallization from acetone-ether separates the isomers. The free bases are obtained by neutralizing an aqueous ethanol solution of the salt, extracting with ether and evaporating the ether extract.

The propylidene compound (2.0 g.) in ethanol solution is hydrogenated with 0.3 g. of platinum oxide at 50 p.s.i. for two hours to give 10-{3-[4-(3-hydroxy-2-methylpropyl)-1-piperazinyl]propyl}-2 - trifluoromethylthiaxanthene.

A mixture of 1.5 g. of the above prepared hydroxy compound, 0.8 g. of acetyl chloride and 20 ml. of benzene is refluxed for 30 minutes to give, after concentration and treatment with ethereal hydrogen chloride, 10-{3-[4-(3-acetoxy-2 - methylpropyl) - 1 - piperazinyl]propyl}-2-trifluoromethylthiaxanthene dihydrochloride.

Example 11

A mixture of 2.5 g. of cis-trans 10-{3-[4-(3-hydroxy-2-methylpropyl)-1-piperazinyl]propylidene}-2 - trifluoromethylthiaxanthene, made as in Example 10, and 3.0 g. of propionyl chloride in 25 ml. of benzene is refluxed for 45 minutes. Concentrating in vacuo and treating the residue with ethereal hydrogen chloride gives cis-trans 10-{3-[4-(3-propionyloxy - 2 - methylpropyl) - 1-piperazinyl]propylidene}-2 - trifluoromethylthiaxanthene dihydrochloride. The isomers are separated by fractional crystallization from ethanol-ether.

Neutralization of the cis, trans or cis-trans mixture of the dihydrochloride salts and hydrogenation of the resulting free bases using a platinum oxide catalyst gives 10-{3-[4-(3-propionyloxy - 2 - methylpropyl) - 1 - piperazinyl]propyl}-2-trifluoromethylthiaxanthene.

Example 12

A mixture of 7.0 g. of 2-trifluoromethyl-10-thiaxanthenone (prepared as in Example 1) and 9.1 g. of 3-[4-(5 - benzyloxypentyl) - 1 - piperazinyl]propylmagnesium chloride (prepared as in Example 1 from 5-benzyloxypentanol) is refluxed in tetrahydrofuran for 90 minutes. Concentrating, then treating the residue with cold water gives 10-{3-[4-(5-benzyloxypentyl) - 1 - piperazinyl]propyl}-10-hydroxy-2-trifluoromethylthiaxanthene.

This hydroxy compound is heated on a steam bath with 50 ml. of concentrated hydrochloric acid for three hours. Concentrating, adding ether and filtering gives a mixture of cis and trans isomers of 10-{3-[4-(5-hydroxypentyl)-1-piperazinyl]propylidene} - 2 - trifluoromethylthiaxanthene dihydrochloride. The isomers are separated by fractional crystallization from acetone-ether. The hydrochlorides are neutralized in aqueous solution, extracted with ether and the extracts concentrated to give the free bases.

Example 13

Twenty grams of 2-trifluoromethyl-10-thiaxanthenone, prepared as in Example 1, in 200 ml. of refluxing isobutyl alcohol is treated with 10.0 g. of sodium. The resulting mixture is refluxed for 30 minutes and the excess alcohol is steam distilled. The residue is cooled, diluted with cold water and filtered to give 2-trifluoromethylthiaxanthene.

A mixture of 13.3 g. of 2-trifluoromethylthiaxanthene, 17.0 g. of 1-(5-benzyloxypentyl)-4-(3-chloropropyl)-piperazine, prepared as in Example 1 from 5-benzyloxypentanol, 2.1 g. of sodium amide and 100 ml. of dry toluene is refluxed for eight hours. The reaction mixture is diluted with water, neutralized and the organic layer separated. Vacuum distillation gives 10-{3-[4-(5-benzyloxypentyl)-1 - piperazinyl]propyl} - 2 - trifluoromethylthiaxanthene.

Refluxing the above prepared benzyloxy compound with concentrated hydrochloric acid for two hours, then concentrating, adding ether and filtering yields 10-{3-[4-(5-hydroxypentyl)-1-piperazinyl]propyl}-2- trifluoromethylthiaxanthene dihydrochloride. The free base is obtained by neutralizing an aqueous solution of the dihydrochloride salt, extracting with ether and removing the solvent from the extracts.

Example 14

A mixture of 13.2 g. of 2-trifluoromethylxanthenone, prepared as in Example 4, and 17.4 g. of 3-[4-(3-benzyloxybutyl)-1-piperazinyl]propylmagnesium chloride, prepared as in Example 1 from 3-benzyloxybutanol, is refluxed in 100 ml. of tetrahydrofuran for one hour. Working up as in Example 12 and treating the resulting hydroxy compound with concentrated hydrochloric acid at 90–95° C. for three hours gives cis-trans 9-{3-[4-(3-hydroxybutyl)-1-piperazinyl]propylidene} - 2 - trifluoromethylxanthene dihydrochloride. Fractional crystallization from ethanol-ether separates the isomers. The free bases are obtained by dissolving the salts in water, neutralizing with sodium carbonate, extracting with ether and evaporating the ether in vacuo.

Hydrogenation of the cis-trans or either separated isomer of the propylidene compound in ethanol with palladium-on-charcoal gives 9-{3-[4-(3 - hydroxybutyl) - 1-piperazinyl]-propyl}-2-trifluoromethylxanthene.

Treating the free base in ethyl acetate with excess tartaric acid furnishes the ditartrate salt.

Example 15

A mixture of 2.0 g. of cis-trans- 9-{3-[4-(3-hydroxybutyl)-1 - piperazinyl]propylidene} - 2 - trifluoromethylxanthene, 0.6 g. of butyryl chloride and 25 ml. of benzene is heated at reflux for 30 minutes. Evaporating in vacuo and treating the residue with ethereal hydrogen chloride gives a mixture of cis and trans 9-{3-[4-(3-butyryloxybutyl)-1 - piperazinyl]propylidene} - 2 - trifluoromethylxanthene dihydrochloride.

Neutralization of an aqueous solution of the dihydrochloride, extraction with ether and evaporation of the ether from the extracts gives the free base.

Hydrogenation of the free base in ethanol solution using a platinum oxide catalyst at 50 p.s.i. for two hours yields 9-{3-[4-(3-butyryloxybutyl)-1-piperazinyl]propyl}-2-trifluoromethylxanthene.

A solution of 0.5 g. of the free base in 50 ml. of ether is reacted with an excess of glacial acetic acid to give the diacetate salt.

*Example 16*

A mixture of 25.0 g. of 2-trifluoromethylxanthene (prepared by refluxing 2-trifluoromethlyxanthenone, made as in Example 4, in isobutanol containing sodium as in Example 13), 35.0 g. of 1-(3-benzyloxypropyl)-4-(3-chloro-2-methylpropyl)piperazine (made as in Example 9 using 3-benzyloxypropanol), 4.4 g. of sodium amide and 200 ml. of dry toluene is heated at reflux for eight hours. Working up as in Example 13 gives 9-{3-[4-(3-benzyloxypropyl) - 1 - piperazinyl] - 2 - methylpropyl}-2-trifluoromethylxanthene. Refluxing with concentrated hydrochloric acid for two hours, then concentrating in vacuo, adding ether and filtering yields 9-{3-[4-(3-hydroxypropyl) - 1 - piperazinyl] - 2 - methylpropyl}-2-trifluoromethylxanthene dihydrochloride.

*Example 17*

By the procedure of Example 1 using 2-benzyloxyethanol in place of 3-benzyloxypropanol, 1-benzyloxyethyl-4-(3-chloropropyl)-piperazine is prepared.

Magnesium (1.3 g.) in 8 ml. of refluxing tretrahydrofuran is treated with 1 ml. of ethyl bromide. A solution of 22.7 g. of 1 - benzyloxyethyl - 4 - (3-chloropropyl)-piperazine in 50 ml. of tetrahydrofuran is added slowly and the mixture is refluxed for one hour.

A solution of 14.0 g. of 2-trifluoromethyl-10-thiaxanthenone (prepared as in Example 1) in tetrahydrofuran is added over ½ hour and the refluxing is continued for two hours. Removing the solvent in vacuo, pouring the residue into ammonium chloride in cold water and filtering gives 10-[3-(4 - benzyloxyethyl-1-piperazinyl)-propyl] - 10-hydroxy-2-trifluoromethylthiaxanthene.

Dehydration and debenzylation of the above prepared hydroxy compound by treating with concentrated hydrochloric acid at 90° C. for five hours gives a mixture of cis and trans isomers of 10-[3-(4-hydroxyethyl-1-piperazinyl)propylidene]-2 - trifluoromethylthiaxanthene dihydrochloride. Separation of the isomers is accomplished by fractional crystallization from ethanol-ether.

The free bases are obtained by dissolving the cis, trans or mixture thereof of the dihydrochloride salts in aqueous ethanol, neutralizing with sodium carbonate and extracting with chloroform. The chloroform extracts are concentrated and distilled to give the 10-[3-(4-hydroxyethyl-1 - piperazinyl)propylidene] - 2 - trifluoromethylthiaxanthene.

*Example 18*

A mixture of 2.1 g. of cis-trans mixture of 10[3-(4-hydroxyethyl-1-piperazinyl)propylidene]-2-trifluoromethylthiaxanthene, made as in Example 17, and 15 ml. of benzene is treated with a solution of 1.0 g. of acetyl chloride in 15 ml. of benzene. Refluxing for 30 minutes, cooling and concentrating in vacuo gives, as the residue, crude 10-[3(4-acetoxyethyl-1-piperazinyl)propylidene] - 2 - trifluoromethylthiaxanthene dihydrochloride which is fractionally crystallized from ethanol-ether.

*Example 19*

To a mixture of 43.4 g. of 10-[3-(4-hydroxyethyl-1-piperazinyl)propylidene] - 2-trifluoromethylthiaxanthene dihyrochloride, made as in Example 17, in 400 ml. of chloroform is added 67 g. of thionyl chloride over 15 minutes. The resulting mixture is refluxed for four hours, cooled and filtered to give 10-[3-(4-chloroethyl - 1 - piperazinyl)propylidene]-2-trifluoromethylthiaxanthene dihydrochloride. The free base is liberated in benzene solution by the addition of aqueous potassium hydroxide, separation of the organic layer and drying.

Sodium (4.9 g.) is added to 203 g. of dry ethylene glycol at 60–70° C. To this mixture is added the above prepared chloroethylpiperazinyl compound in benzene solution at 90° C. over 30 minutes. The benzene is removed and the residue is stirred at room temperature for 18 hours. Water is added. The organic layer is separated and extracted into dilute hydrochloric acid. The aqueous extract is basified with sodium hydroxide and extracted with benzene. The benzene is removed in vacuo, leaving 10-[3-(4-hydroxyethoxyethyl - 1-piperazinyl)propylidene]-2-trifluoromethylthiaxanthene.

The dihydrochoride salt is obtained by treating an alcoholic solution of the free base with ethereal hydrogen chloride.

*Example 20*

A mixture of 5.0 g. of 10[3-(4-hydroxyethyl - 1 - piperazinyl)propylidene]-2-trifluoromethylthiaxanthene dihydrochloride, prepared as in Example 17, and 2.5 g. of thionyl chloride in 75 ml. of chloroform is refluxed for six hours. Removal of the solvent in vacuo gives 10-[3-(4-chloroethyl-1-piperazinyl)propylidene] - 2-trifluoromethylthiaxanthene dihydrochloride.

A mixture of 20 ml. of β-hydroxyethyl ether in 20 ml. of dry benzene is treated with 0.5 g. of sodium. The chloro intermediate prepared above (converted to the free base by the procedure of Example 19) is added and the mixture is heated on a steam bath for three hours, then stirred at room temperature for 18 hours. Water is added and the mixture is extracted with benzene. Extraction of the benzene solution with dilute acid, neutralization of the acid extracts, extraction with chloroform and evaporation of the chloroform extract gives 10-[3-(4-hydroxyethoxyethoxyethylpiperazinyl) - propylidene]-2-trifluoromethylthiaxanthene.

*Example 21*

A solution of 13.2 g. of 2-trifluoromethyl-9-xanthenone, prepared as in Example 4, in tetrahydrofuran is added over one hour to 16.0 g. of 3-(4-benzyloxyethyl-1-piperazinyl) propylmagnesium chloride, prepared as in Example 17, in tetrahydrofuran while gently refluxing. Refluxing is continued for two hours. Concentrating, pouring the residue into ammonium chloride, ice and water, extracting with ether, evaporating the extracts and treating the residue with concentrated hydrochloric acid at 95° C. for one hour gives a mixture of cis and trans 9-[3-(4-hydroxyethyl-1-piperazinyl)propylidene]-2-trifluoromethylxanthene dihydrochloride. Fractional crystallization from ethanol-ether separates the isomers. The free bases are obtained by neutralizing an aqueous solution of the dihydrochloride, extracting into ether and evaporating the ether in vacuo.

Hydrogenation of the propylidene compound in acetic acid solution with palladium-on-charcoal at 50 p.s.i. for two hours gives 9-[3-(4-hydroxyethyl-1-piperazinyl)propyl]-2-trifluoromethylxanthene.

*Example 22*

Phenyl chlorocarbonate (1.9 g.) is added to a solution of 4.2 g. of 9-[3-(4-hydroxyethyl-1-piperazinyl)propylidene]-2-trifluoromethylxanthene, prepared as in Example 21, in 25 ml. of anhydrous pyridine with stirring. After 15 hours at 25–30° C., water is added and the mixture is extracted with chloroform to give, after concentration of the extracts, the phenylcarbonate of 9-[3-(4-hydroxyethyl-1-piperazinyl)propylidene]-2-trifluoromethylxanthene.

A solution of this phenylcarbonate in 50 ml. of anhydrous ether is added dropwise to 100 ml. of liquid ammonia with stirring. After 10 hours the reaction mixture is treated with water and extracted with ether. The ether extracts are washed with dilute sodium carbonate solution, dried and concentrated in vacuo to give 9-[3-(4-carbamoyloxyethyl - 1 - piperazinyl)propylidene]-2-trifluoromethylxanthene.

The free base is converted to the dihydrochloride salt by treatment with ethanolic hydrogen chloride.

Example 23

Treatment of 9-[3-(4-hydroxyethyl-1-piperazinyl)propylidene]-2-trifluoromethylxanthene, prepared as in Example 21, with powdered sodium in toluene and dimethylcarbamoyl chloride gives, after refluxing for three hours, treating with water, and concentrating the organic layer, 9 - [3 - (4 - dimethylcarbamoyloxyethyl - 1 - piperazinyl)propylidene]-2-trifluoromethylxanthene.

Treating a solution of the free base in ethyl acetate with excess maleic acid furnishes the dimaleate salt.

Similarly by employing diethylcarbamoyl chloride in the above procedure, 9-[3-(4-diethylcarbamoyloxyethyl-1-piperazinyl)propylidene]-2-trifluoromethylxanthene is obtained.

A mixture of 2.0 g. of 9-[3-(4-dimethylcarbamoyloxyethyl - 1 - piperazinyl)propylidene]-2-trifluoromethylxanthene, 0.4 g. of palladium-on-charcol and 50 ml. of ethanol is hydrogenated at 50 p.s.i. for two hours. Filtration and removal of the solvent in vacuo gives 9-[3-(4-dimethylcarbamoyloxyethyl - 1 - piperazinyl)propyl] - 2 - trifluoromethylxanthene.

Example 24

A mixture of 26.6 g. of 2-trifluoromethylthiaxanthene (prepared as in Example 13), 20.9 g. of 1-formyl-4-(3-chloropropyl)piperazine, 4.1 g. of sodium amide and 200 ml. of toluene is refluxed for eight hours. Diluting with water, neutralizing, separating the organic layer and distilling in vacuo gives 10-[3-(4-formyl-1-piperazinyl)propyl]-2-trifluoromethylthiaxanthene, A mixture of 5.0 g. of the above prepared N-formyl compound is heated at reflux with 2 ml. of 40% sodium hydroxide and 100 ml. of aqueous ethanol for 15 minutes. Concentrating, treating the residue with benzene and water, and evaporating the benzene layer gives, as the residue, 10 - (3 - N - piperazinylpropyl)-2-trifluoromethylthiaxanthene.

Refluxing 3.9 g. of the above prepared N-piperazinyl compound with 0.44 g. of ethylene oxide in methanol solution for two hours, then evaporating the solvent in vacuo leaves 10-[3-(4-hydroxyethyl-1-piperazinyl)-propyl]-2-trifluoromethylthiaxanthene.

The above prepared hydroxyethyl compound in benzene solution is refluxed with an excess of acetyl chloride for 30 minutes to give, after cooling and concentrating, 10-[3-(4 - acetoxyethyl-1-piperazinyl)propyl]-2-trifluoromethylthiaxanthene dihydrochloride.

What is claimed is:

1. A compound of the class consisting of a free base and its nontoxic, pharmaceutically acceptable, acid addition salts the free base having the formula:

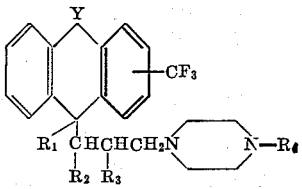

in which:
  Y is a member selected from the group consisting of sulfur and oxygen;
  $R_1$ and $R_2$ are members selected from the group consisting of hydrogen and, when taken together, a single bond;
  $R_3$ is a member selected from the group consisting of hydrogen and methyl; and
  $R_4$ is a member selected from the group consisting of hydroxyalkylene, lower alkanoyloxyalkylene, benzoyloxypropyl, carbamoyloxyethyl, di-lower alkylcarbamoyloxyethyl, hydroxyethoxyethyl and hydroxyethoxyethoxyethyl,
each of said alkylene moieties having 2 to 5 carbon atoms and separating the nitrogen and oxygen atoms to which it is attached by at least 2 carbon atoms.

2. A compound of the formula:

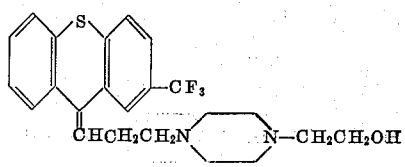

3. A compound of the formula:

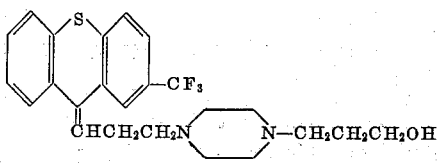

4. A compound of the formula:

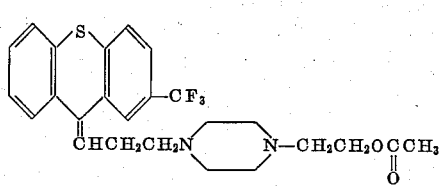

5. A compound of the formula:

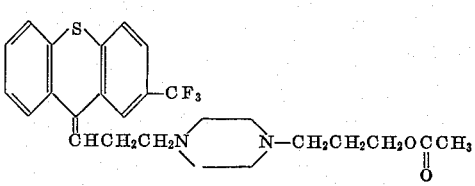

6. A compound of the formula:

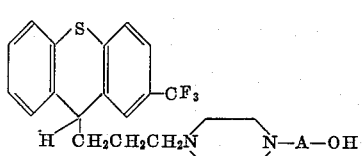

in which A is an alkylene chain having 2 to 5 carbon atoms and separating the nitrogen and oxygen atoms to which it is attached by at least 2 carbon atoms.

7. A compound of the formula:

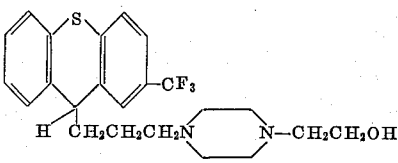

8. A compound of the formula:

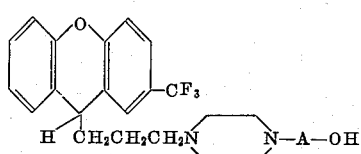

in which A is an alkylene chain having 2 to 5 carbon atoms and separating the nitrogen and oxygen atoms to which it is attached by at least 2 carbon atoms.

9. compound of the formula:

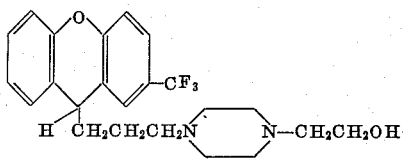

10. A compound of the formula:

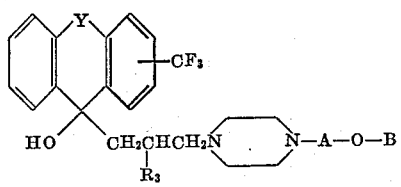

in which:
- Y is a member selected from the group consisting of sulfur and oxygen;
- A is an alkylene chain having 2 to 5 carbon atoms and separating the nitrogen and oxygen atoms to which it is attached by at least 2 carbon atoms;
- $R_3$ is a member selected from the group consisting of hydrogen and methyl; and
- B is a member selected from the group consisting of benzyl and benzhydryl.

References Cited by the Examiner

UNITED STATES PATENTS

| | | | |
|---|---|---|---|
| 2,928,767 | 3/1960 | Gulesich et al. | 260—268 |
| 2,940,969 | 6/1960 | Bonvicino et al. | 260—268 |
| 2,951,082 | 8/1960 | Sprague et al. | 260—293.4 |
| 2,996,503 | 8/1961 | Sprague et al. | 260—328 |
| 3,113,137 | 12/1963 | Schaeren et al. | 260—268 |
| 3,116,291 | 12/1963 | Petersen et al. | 260—268 |
| 3,149,103 | 9/1964 | Petersen et al. | 260—268 |
| 3,192,204 | 6/1965 | Craig et al. | 260—268 |

OTHER REFERENCES

Yale: Journal Medicinal & Pharmaceutical Chemistry, vol. 1, pp. 121–133 (1959).

ALEX MAZEL, *Primary Examiner.*

IRVING MARCUS, WALTER A. MODANCE, NICHOLAS S. RIZZO, *Examiners.*

N. H. STEPNO, J. W. ADAMS, *Assistant Examiners.*